United States Patent
Arbogast et al.

(10) Patent No.: US 9,436,187 B2
(45) Date of Patent: Sep. 6, 2016

(54) SYSTEM AND METHOD FOR DECENTRALIZED, MULTI-AGENT UNMANNED VEHICLE NAVIGATION AND FORMATION CONTROL

(71) Applicants: William Dale Arbogast, Charleston, SC (US); Waleed Barnawi, Mt. Pleasant, SC (US); Michael Eric Lind, Charleston, SC (US); Blake Wall, Charleston, SC (US)

(72) Inventors: William Dale Arbogast, Charleston, SC (US); Waleed Barnawi, Mt. Pleasant, SC (US); Michael Eric Lind, Charleston, SC (US); Blake Wall, Charleston, SC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 14/597,522

(22) Filed: Jan. 15, 2015

(65) Prior Publication Data

US 2016/0209849 A1    Jul. 21, 2016

(51) Int. Cl.
  *G05D 1/00*  (2006.01)
  *G05D 1/02*  (2006.01)
  *G01C 21/20*  (2006.01)

(52) U.S. Cl.
  CPC ............. *G05D 1/0291* (2013.01); *G01C 21/20* (2013.01); *G05D 1/0088* (2013.01)

(58) Field of Classification Search
  CPC ... G05D 1/0291; G05D 1/0088; G05D 21/20
  USPC ...................................................... 701/3, 23
  See application file for complete search history.

(56) References Cited

U.S. PATENT DOCUMENTS

| 5,646,855 | A | 7/1997 | Jones |
| 7,107,148 | B1 | 9/2006 | Bodin |
| 7,908,040 | B2 | 3/2011 | Howard |
| 7,953,551 | B2 | 5/2011 | Park |
| 8,494,689 | B1 | 7/2013 | Ashton |
| 8,612,085 | B2 | 12/2013 | Flohr |
| 8,639,408 | B2 | 1/2014 | Anderson |
| 2015/0153738 | A1* | 6/2015 | Al-Buraiki ........... G05D 1/0295 701/117 |

OTHER PUBLICATIONS

Lorenzo Sabattini—2012 PhD Thesis—Nonlinear Control Strategies for Cooperative Control of Multi-Robot Systems;—http://www.arscontrol.unimore.it/documents/sabattini_lorenzo_phdthesis.pdf.
Laura E Barns—2008 Thesis—University of South Florida—A potential field based formation control methodology for robot swarms; http://scholarcommons.usf.edu/etd/131/.
Long Qin et al—Article for—U.S. National Institutes of Health's National Library of Medicine—Dec. 19, 2013—Formation Control of Robotic Swarm Using Bounded Artificial Forces; http://www.ncbi.nlm.nih.gov/pmc/articles/PMC3881698/.

* cited by examiner

*Primary Examiner* — Richard Camby
(74) *Attorney, Agent, or Firm* — SPAWAR Systems Center Pacific; Kyle Eppele; Susanna J. Torke

(57) ABSTRACT

A system and method for a USV fleet is disclosed that can execute autonomous path-planning in an A2/AD environment, where communication reach back to a base station for instruction or Positional, Navigation, and Timing (PNT) data is not assured. This process has the ability to adapt considering the failure and intermittent connection of the ad-hoc USV-to-USV data network. This process also has the ability to continue operation considering the failure of any or all communications between members and is immediately prepared for reconnection should failures occur.

18 Claims, 14 Drawing Sheets

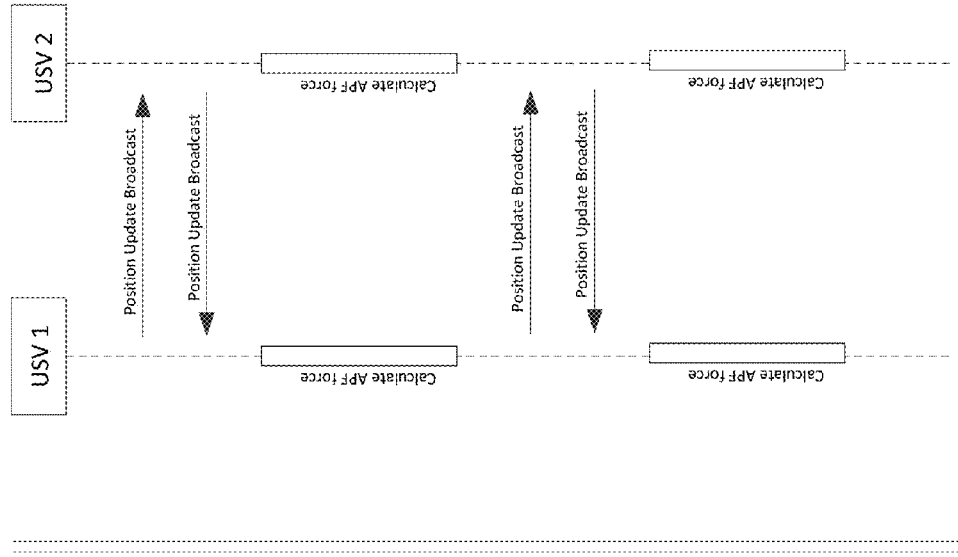
Figure 3.A and Figure 3.B
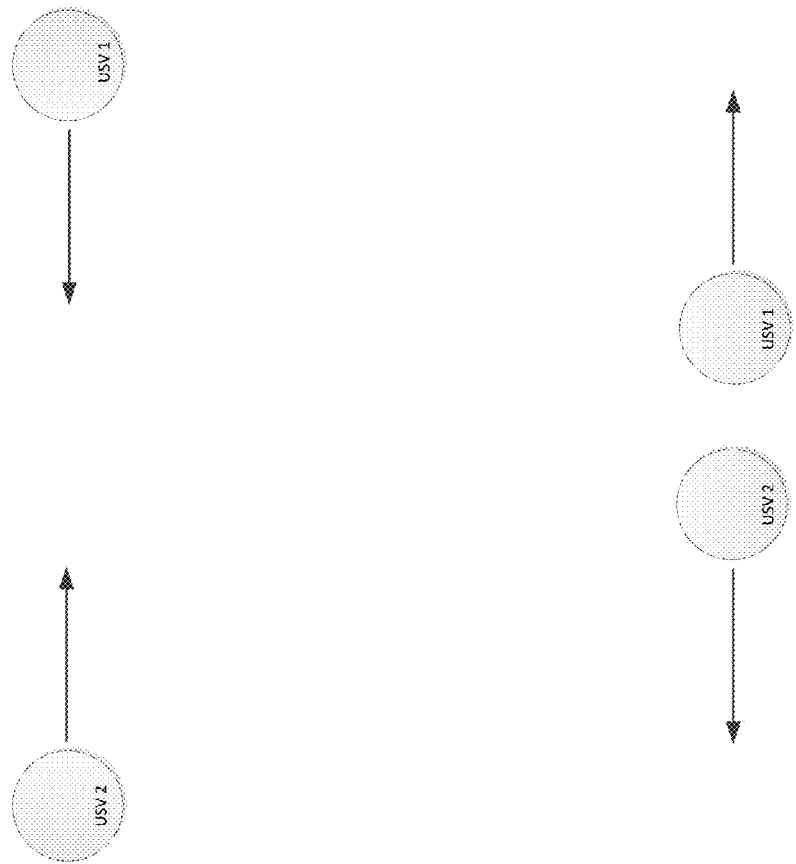

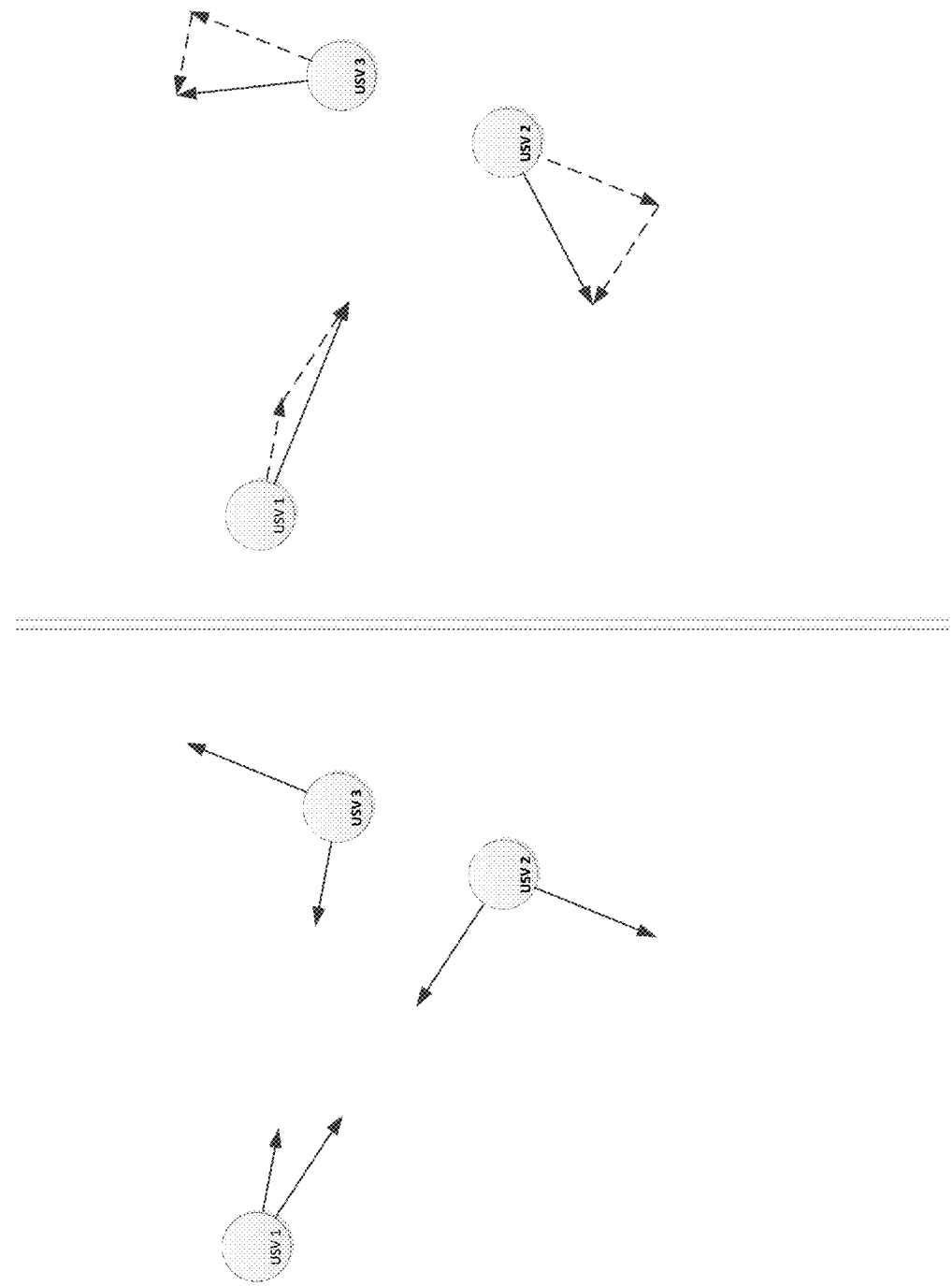
Figure 3.C

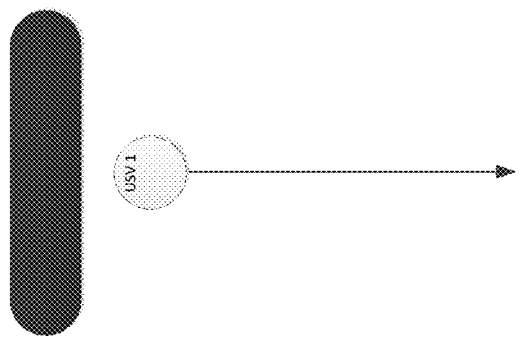
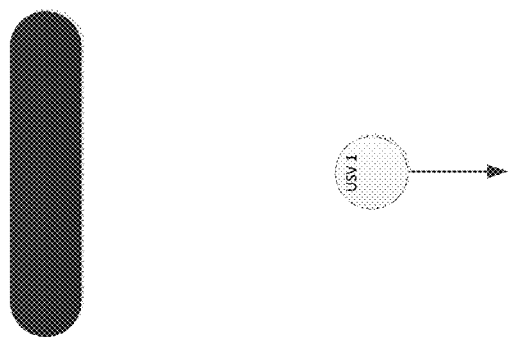
Figure 3E

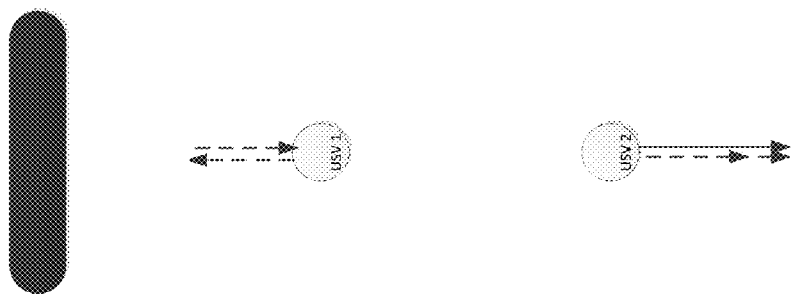
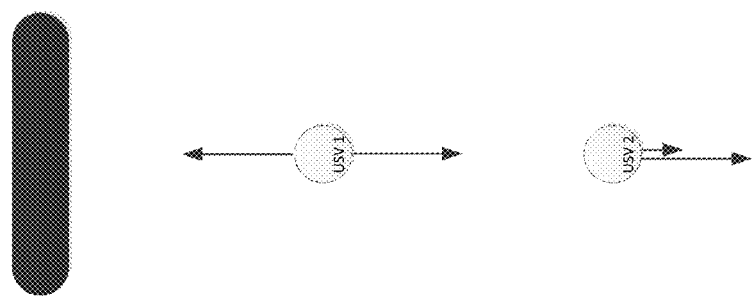
Figure 3F

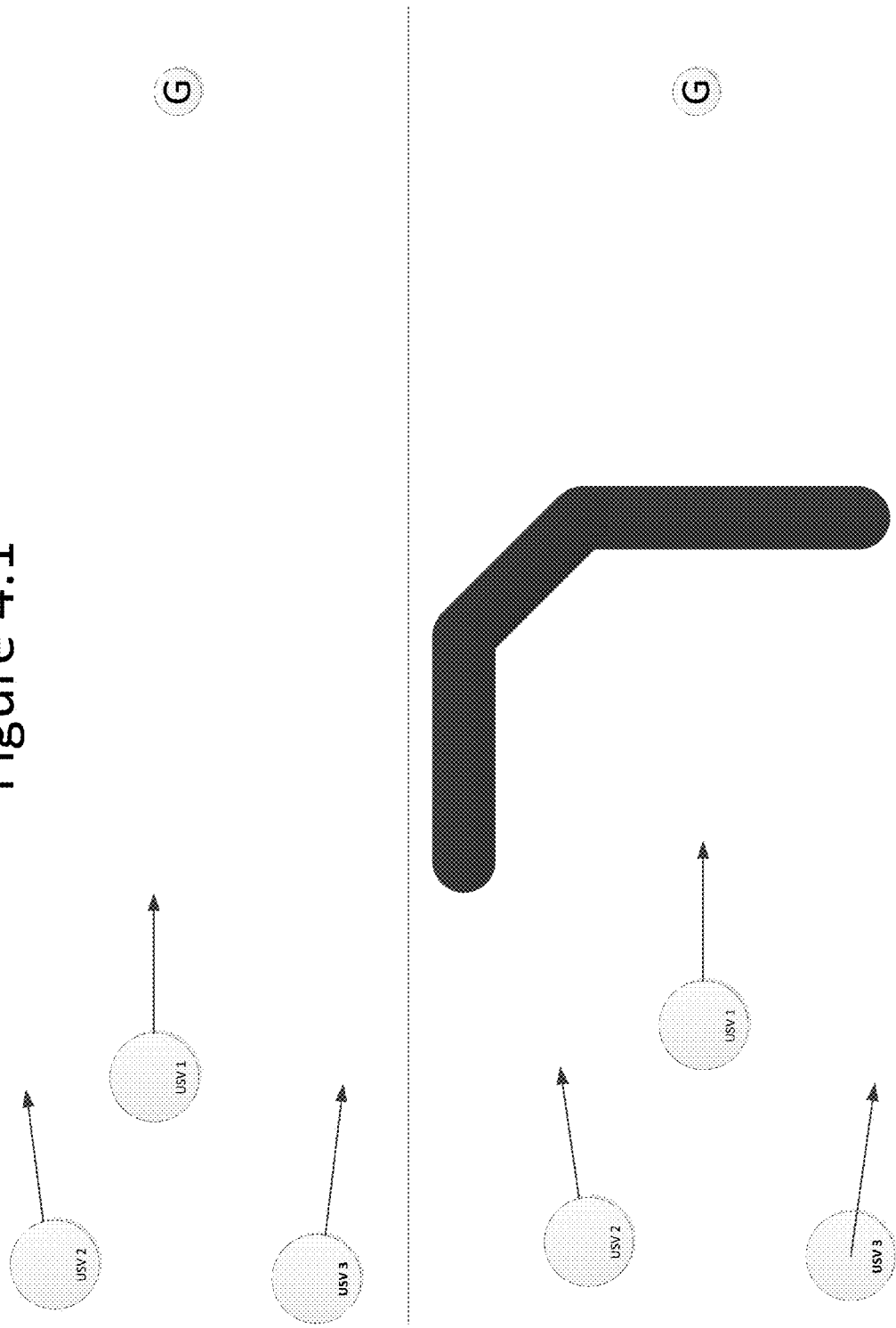
Figure 4.1

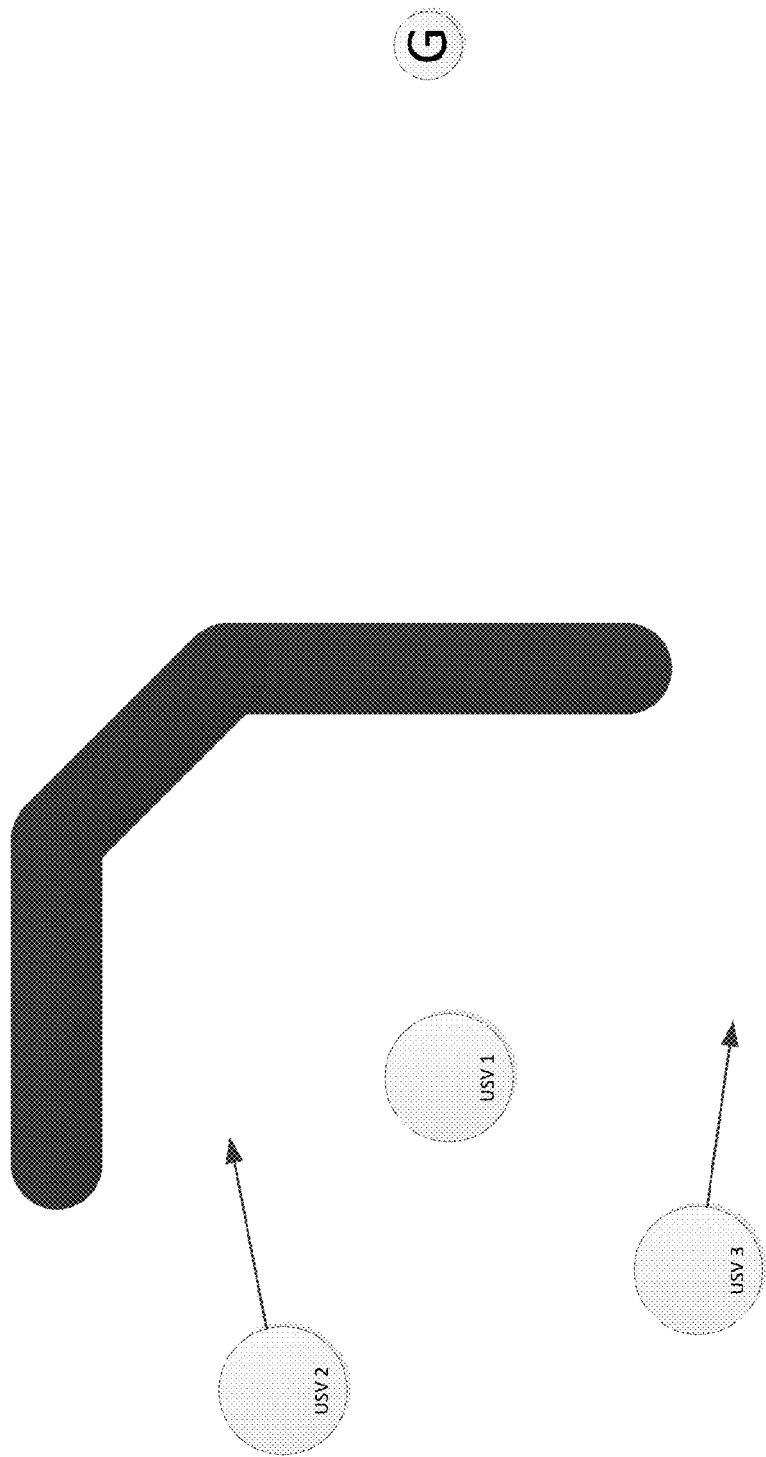
Figure 4.2

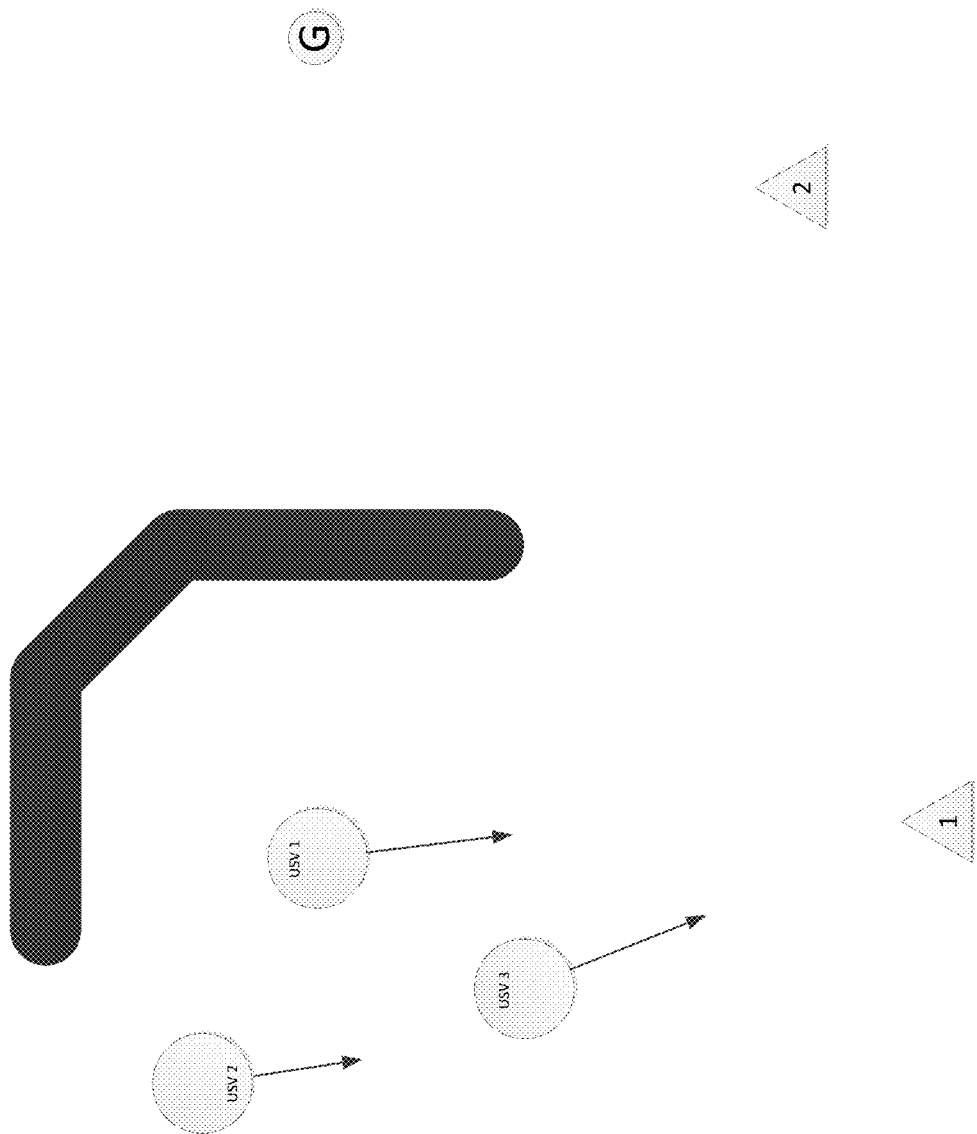
Figure 4.3

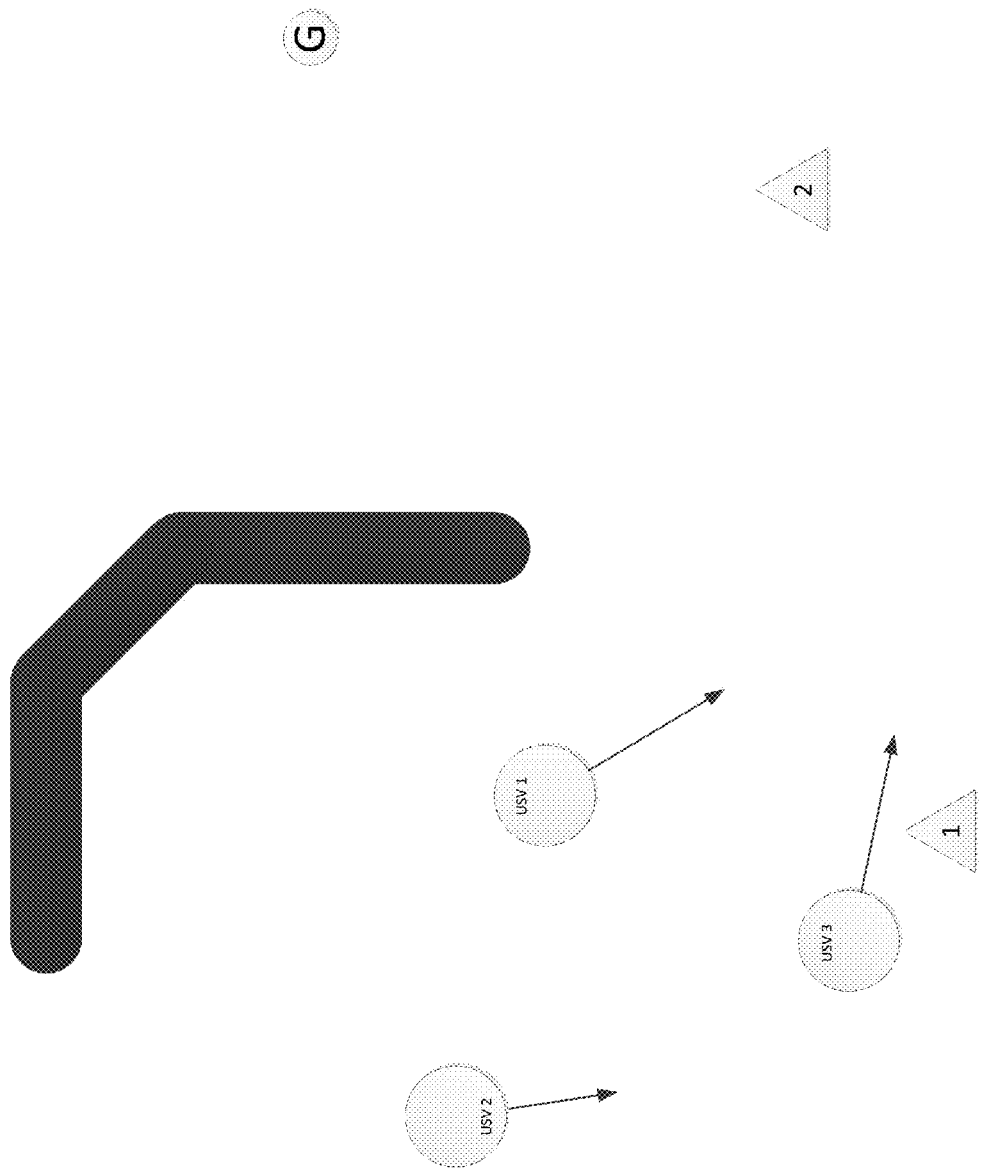
Figure 4.4

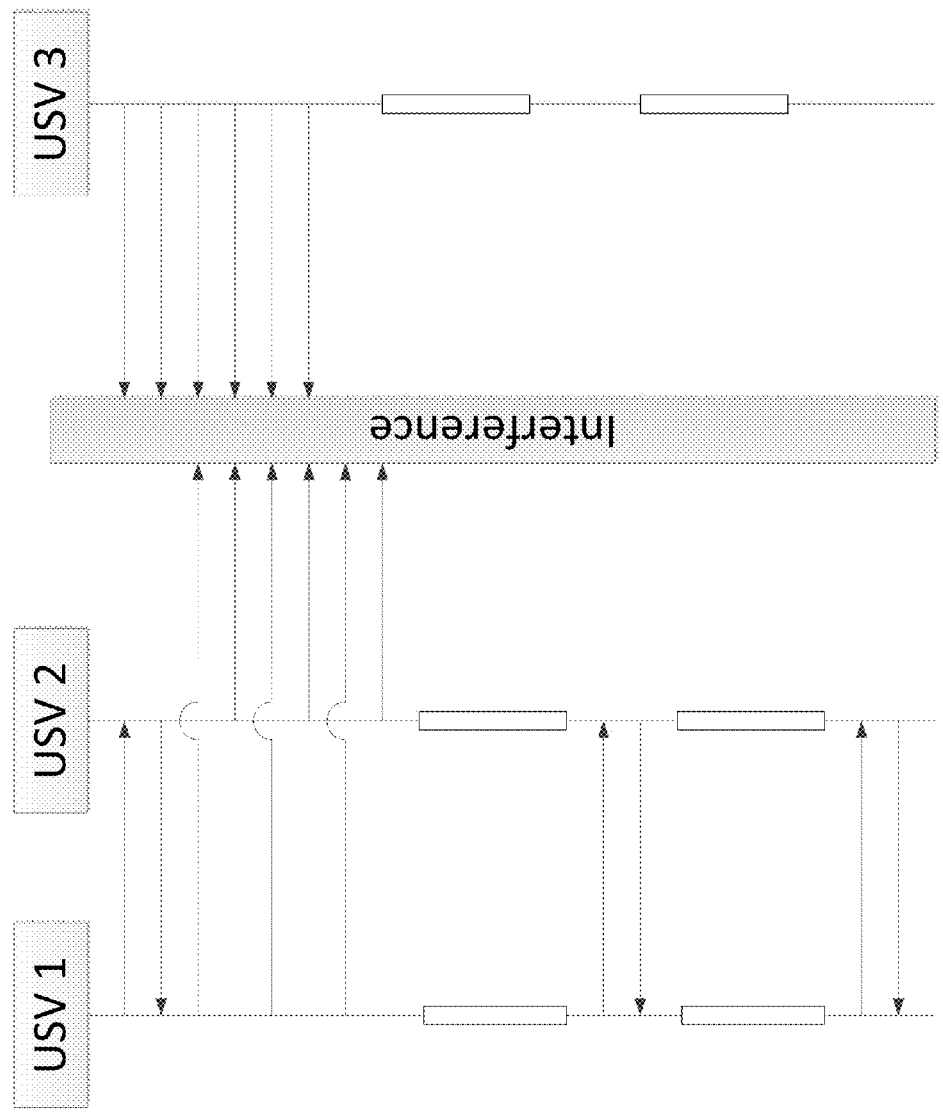

Figure 6
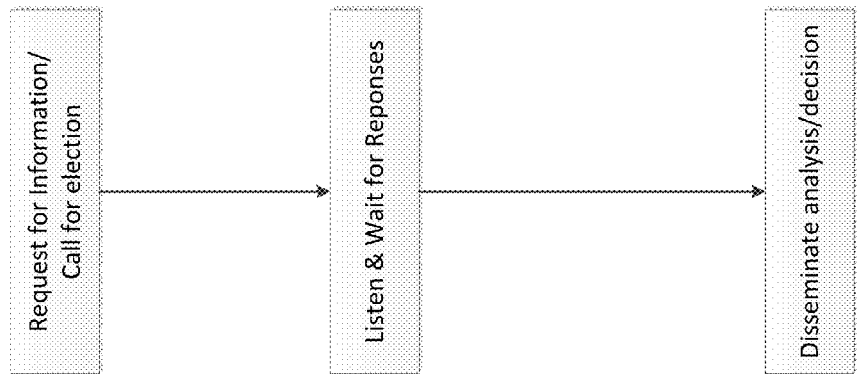
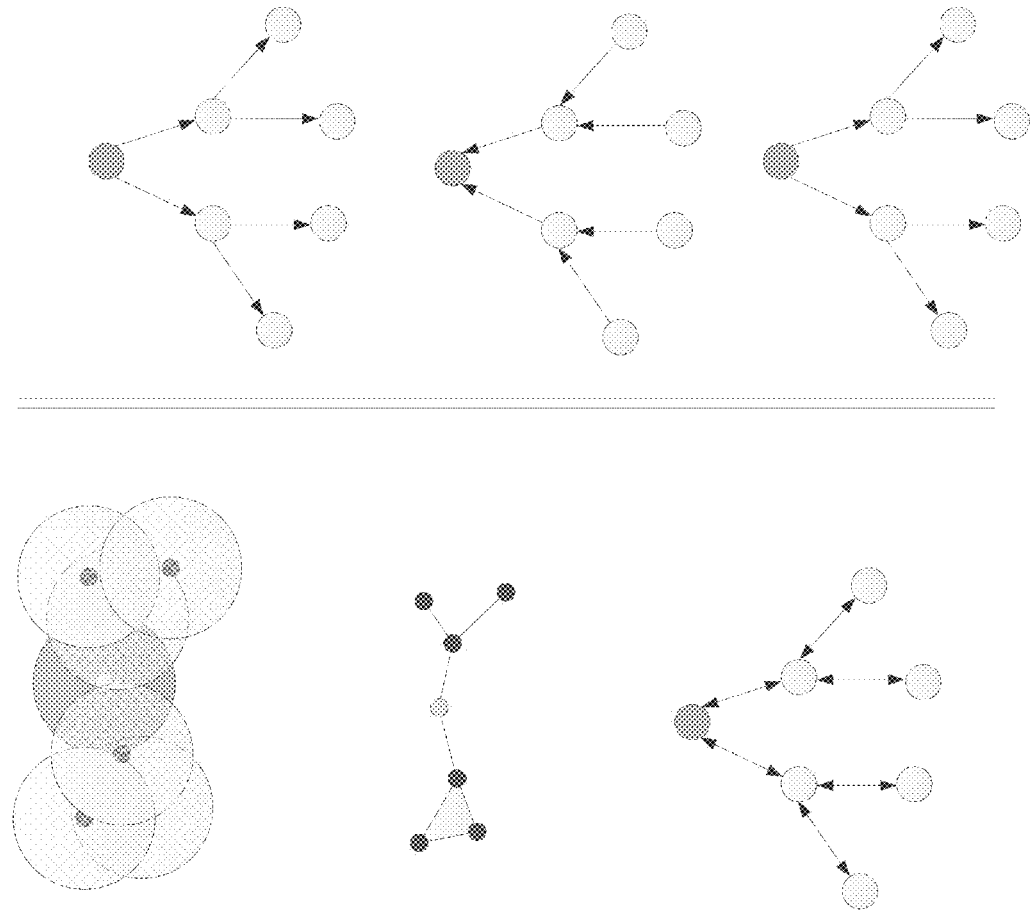

SYSTEM AND METHOD FOR DECENTRALIZED, MULTI-AGENT UNMANNED VEHICLE NAVIGATION AND FORMATION CONTROL

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Atlantic, Code 72000; voice (843) 218-3495; ssc_lant_t2@navy.mil. Reference Navy Case Number 103298

BACKGROUND

In order to control a fleet of unmanned surface vehicles, or USVs, in an environment that contains unknown obstacles it is not sufficient to simply use a path-planning algorithm designed for a single USV. Navigation and goal-finding behavior must work in such a way that a fleet of USVs discover, share, and cooperatively negotiate obstacles.

In addition, operation in an electromagnetic-spectrum limited environment means that there is no guaranteed or reliable ability to "reach-back" communication to a central base station or processing node. Since it is not efficient to pre-plan precise fleet movements for every type of path and any obstacle, a real-time and distributed system solution is needed. Another constraint imposed by electromagnetic-spectrum limits are that individual directions cannot be calculated and handed out; each USV must have an intuition of where to go and how fast to get there while considering its own location amongst the fleet of other USVs and obstacles.

A strategy that works well for a single USV is the use of artificial potential fields (APF). Virtual forces are felt or sensed by the USV. This results in the USV moving away from obstacles and towards waypoints. This concept is used by the USV fleet but it does not solely guarantee mission assurance. Local minimums, where the sum of all virtual forces in a location is equal to zero, are a well-known problem in this approach. If a USV solely relies on APF to navigate and then gets trapped in a local minim, the USV will not have the virtual motivation to continue towards the goal. For this reason, APF guidance alone is not a sufficient navigation strategy.

SUMMARY

A method for navigating a fleet of multiple unmanned vehicles from a first starting location to a second ending location via an initial pathway of waypoints. The iterative method for each of the unmanned vehicles comprises the steps of: accumulating sensor information representative of obstacle locations and boundaries of one or more sensed obstacles and vehicle locations of other sensed vehicles in the fleet between the first and second locations; calculating artificial potential field (APF) additive force vectors representative of virtual forces between each of the vehicles and between each vehicle and the sensed obstacles, including calculating when a force vector is zero which is representative of a local minimum; responsive to the local minimum, communicating to the fleet that a new path needs to be generated and generating a new path forward, including calculating one or more new path forward waypoints such that the local minimum is removed because of attraction to the new waypoints by calculating additive force vectors to remove the local minimum and attract the vehicle to the new waypoints around the sensed obstacles and the other sensed vehicles to the second location.

BRIEF DESCRIPTION OF THE DRAWINGS

Throughout the several views, like elements are referenced using like references, wherein:

FIGS. 3A-3F are a series of diagrams describing how artificial potential field (APF) is implemented, in which:

FIGS. 3A and 3B show the virtual force, or "intuition of where to be", when two (2) USVs are too far apart or too close together.

FIG. 3C shows that how the virtual vectors are additive to create new resulting directions.

FIG. 3D shows how USV are attracted to objectives (shown here as 'G').

FIG. 3E shows how USV's avoid obstacles.

FIG. 3F shows how local minimums can occur.

FIGS. 4.1-4.4 are a series of illustrations that show a solution to the local-minimum problem, in which:

FIG. 4.1 shows the USVs with an anticipated map at the top and the bottom of FIG. 4.1 shows there in fact is an obstacle.

FIG. 4.2 shows the USVs approach to the obstacle.

FIG. 4.3 shows that new waypoints have been calculated.

FIG. 4.4 shows the system of USVs successfully moving around the obstacle, and making progress towards the goal.

FIG. 5 shows that the system is robust to universal communication loss

FIG. 6 shows how information and decisions propagates through the distributed USV network.

DETAILED DESCRIPTION OF THE EMBODIMENTS

In one embodiment, disclosed is a process whereby the USVs, as distributed information/computing system, re-evaluate the terrain and obstacles in order to pick new waypoints which create new virtual forces and remove the local minimum. The system and method includes methods of mission survival which are robust against the loss of communication functionality, and the total operational failure of a USV.

One embodiment can provide path-planning and navigation of multiple unmanned surface vehicles (USVs) using a decentralized control architecture (e.g., there is no node with which communication is essential for the success of any other vehicle). The electromagnetic spectrum limited or communication limited environment means that the system is adaptable to failure of communications between any or all nodes.

The system and method is applicable to multi-domain (air, sea-surface, underwater, space) unmanned system herein referred to as UxV. Algorithmic developments provide feasible solutions that require little processing time and resources for energy preservation exemplified by the significant computational speed-up of established approaches such as A*. The robust network allows segmentation of UxV host into smaller teams to accomplish multiple missions simultaneously. This same approach allows for unification of small UxV teams to increase mission effectiveness.

The approach to path planning takes into account a communications restrained environment and dynamic formation control for navigation around obstacles and through littoral areas are necessary. Multiple USVs can provide a common operational picture and environmental surveillance that would be highly beneficial for cooperative intelligent decision-making in the absence of human interaction.

Multi-agent autonomous systems must not only coordinate movements cooperatively to navigate to a given location in formation, but must do so while being tolerant of individual system failure, including either a universal or isolated communications failure, without depending on a single node or base station for instruction, position, navigational or timing data.

The solution includes the combination of the following attributes: long range path planning, short range obstacle avoidance, resilient ad-hoc communication network, decentralized control strategy.

Figure 1:
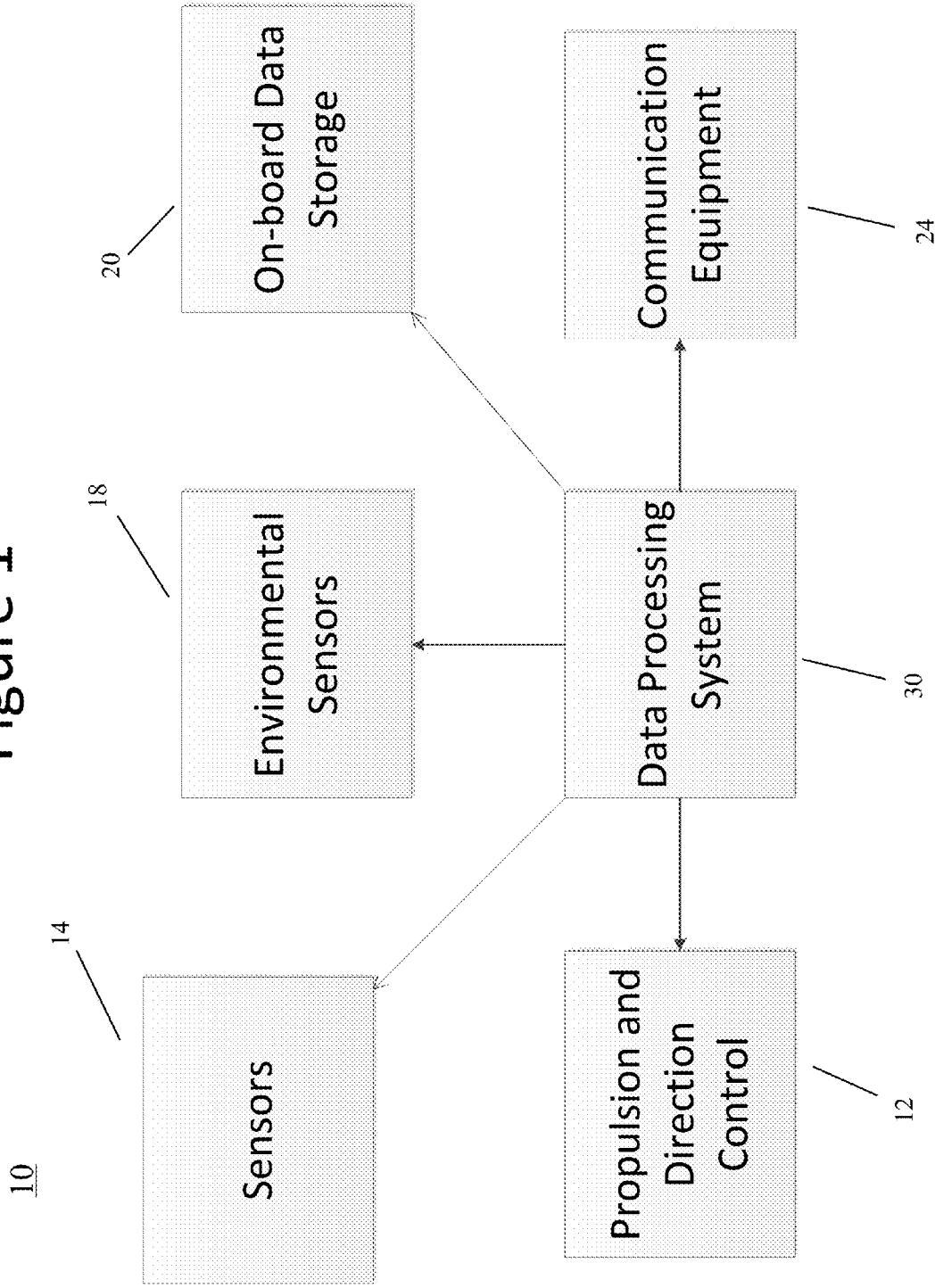
FIG. 1 is a systems diagram of an unmanned surface vehicle, or USV.

FIG. 1 is a systems diagram of an unmanned surface vehicle, or USV 10. Some propulsion and direction control 12 is needed to move and steer. Sensors 14, which could include infrared camera, visible light camera, radar, 2D or 3D LIDAR, or sonar, accurately measure distances to nearby objects. Environmental sensors 18 detect are used to observe and feedback measurements of the environment to aid in decision making, which could include thermometer, dead reckoning, rain sensor, etc. On-board storage 20 refers to the USV's ability to store and recall information. Communication equipment 24 is required to give and receive information locally. System 10 is controlled by a suitable data processing system 30.

Figure 2:
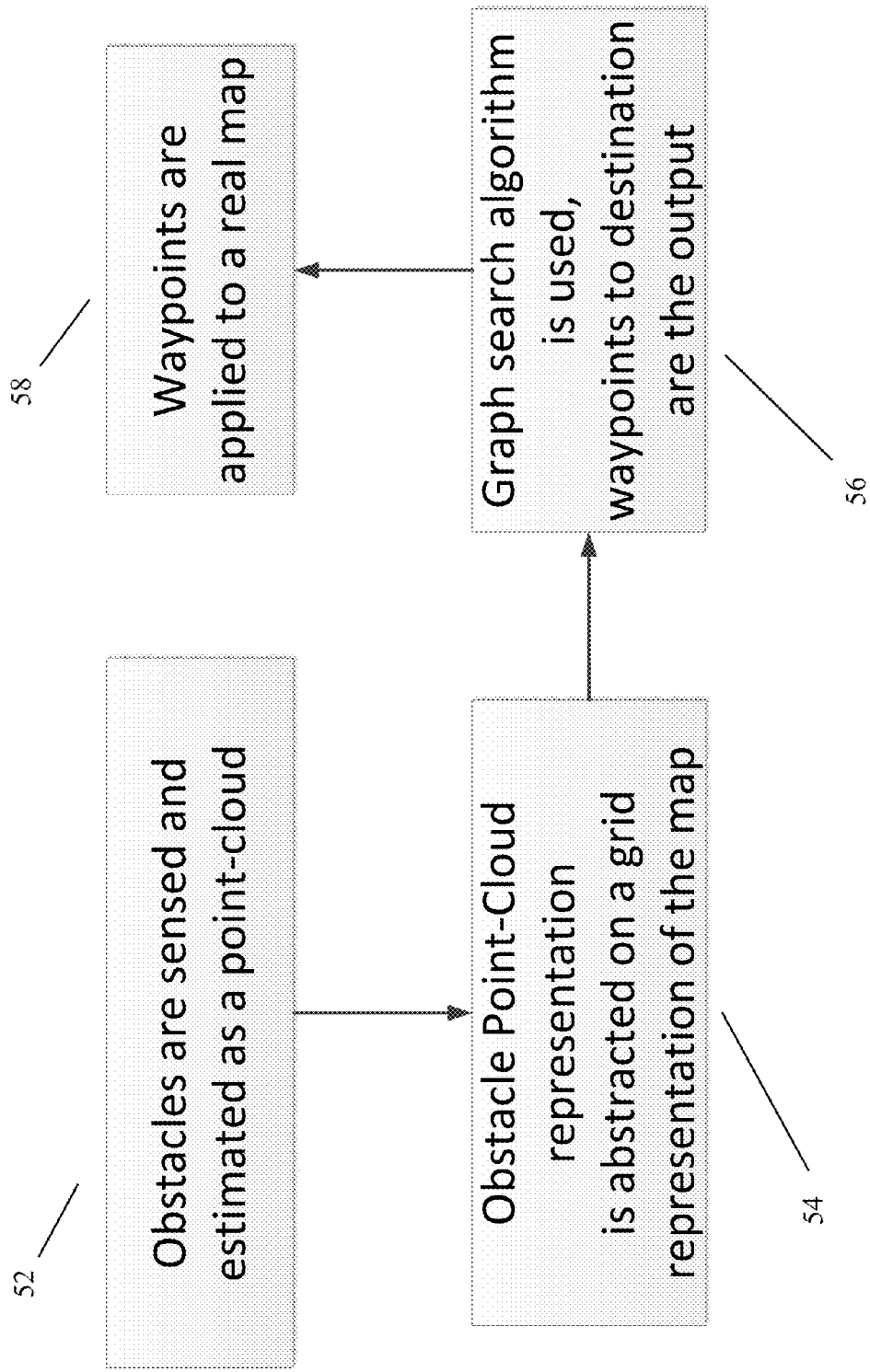
FIG. 2 shows how sensor information is turned into a path, in the form of step-by-step instructions (or waypoints).

FIG. 2 shows how sensor information is turned into a path, in the form of step-by-step instructions (or waypoints). LIDAR or similar spatial sensors map surroundings, and define the boundaries of obstacles. These shapes are discretized onto a grid. Graph search algorithms are used to generate an optimal path on the grid-space. The optimal path is represented as a series of waypoints that to be followed sequentially.

The steps set forth in FIG. 2 are: step 52, obstacles are sensed and estimated as a point-cloud; step 54, obstacle point-cloud representation is abstracted on a grid representation of the map; step 56, graph search algorithm is used, waypoints to destination are the output; and step 58, waypoints are applied to a real map.

FIGS. 3A-3F are a series of diagrams describing how artificial potential field (APF) is implemented.

FIGS. 3A and 3B show the virtual force, or "intuition of where to be", when two (2) USVs are too far apart or too close together (FIG. 3A). The right side in FIG. 3B is the system sequence diagram which illustrates how the USVs share information and compute APF forces, which is an iterative process.

FIG. 3C shows that how the virtual vectors are additive to create new resulting directions. On the left side of FIG. 3C, each USV feels 2 forces from the other USVs. For example, USV1 feels forces from USV2 and USV3.

On the right side of FIG. 3C, the solid-line vector shows the direction and magnitude vector sum from the two dashed-line vectors for USV1, USV2, and USV3 of the APF force fields.

Figure 3D:
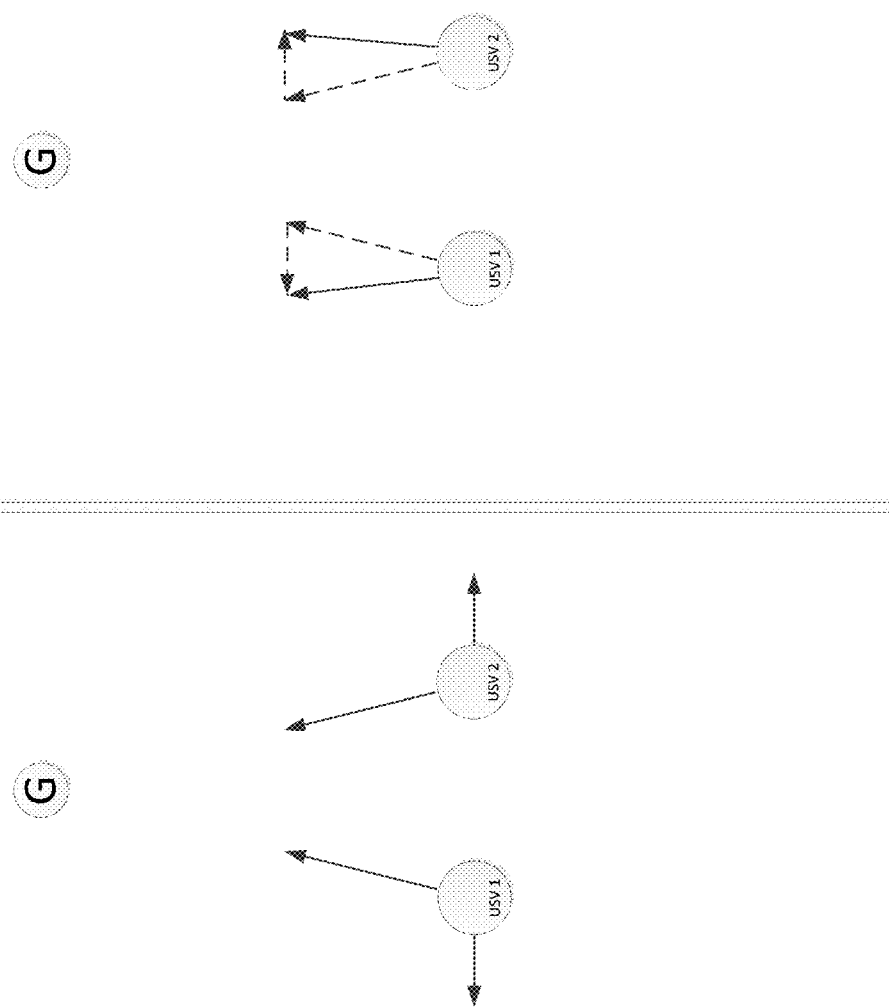

FIG. 3D shows how USVs are attracted to objectives (show here as goal 'G'). Heading to the goal is always good, but it is also important not to hit another USV on route.

FIG. 3E shows how the USV's avoid obstacles. The APF force is relative to the distance from an obstacle; the closer a USV is to an obstacle, the stronger the push away from the obstacle is felt. For example, note that the APF force on the left side of FIG. 3E for USV1 is less than the APF force on the right side of FIG. 3E.

FIG. 3F shows how local minimums can occur. On the left, USV 1 and 2 both feel forces from the obstacle and the other USV. However, USV1 forces sum to zero, which means there is no resulting force vector (as seen on the right). Without a resultant vector, a USV will not move towards the goal and thus fail the mission. Note the resultant force vector for USV2 on the right side of FIG. 3F.

FIGS. 4.1-4.4 are a series of illustrations that show our solution to the local-minimum problem.

The top of FIG. 4.1 shows the USVs (USV1, USV2, USV3) with an anticipated map toward goal G; before arriving, the USVs were not aware of any obstacles between them and the goal. The bottom of FIG. 4.1 shows there in fact is an obstacle.

In FIG. 4.2, as the USVs approach the obstacle, USV 1's APF force sum to zero, meaning USV1 is at a local minimum. USV1 communicates to rest of the fleet (FIG. 6) the need for a new path to be generated, and then generates the new path forward (FIG. 2). In FIG. 4.2, USV2 and USV3 show an APF force vector.

In FIG. 4.3, new waypoints have been calculated for USV1, USV2, and USV3. The local-minimum is instantly removed because USV1 is now attracted to Waypoint 1, and USV1's virtual forces no longer sum to zero.

FIG. 4.4 shows the system of USVs successfully moving around the obstacle, and making progress towards the goal G.

FIG. 5 shows our system is robust to universal communication loss. In the case that a USV cannot talk to the rest of the group after a set period of time, the group will operationally stop relying upon each other. The left side shows USV1 and USV2, after repeat attempts to contact USV3, proceed to continue onward without it (likewise for USV3). If the USVs are able to re-communicate again, information is shared between them again (FIG. 6) and they proceed onward.

FIG. 6 shows how information and decisions propagates through our distributed USV network. The top left of FIG. 6 shows seven USVs with the communication ranges. The middle left of FIG. 6 shows the communication network. In order to prevent redundancy, a min-spanning tree (bottom left) is created; there is only one designated communication path from the top/leader to any other lead/follower.

On the right side of FIG. 6 a process of leader requesting information, waiting and collecting feedback, and finally disseminating official decisions is shown. Note that this is an iterative process, and the 'leader' is a role that can be assigned or designated to any USV as needed.

Figure 7:
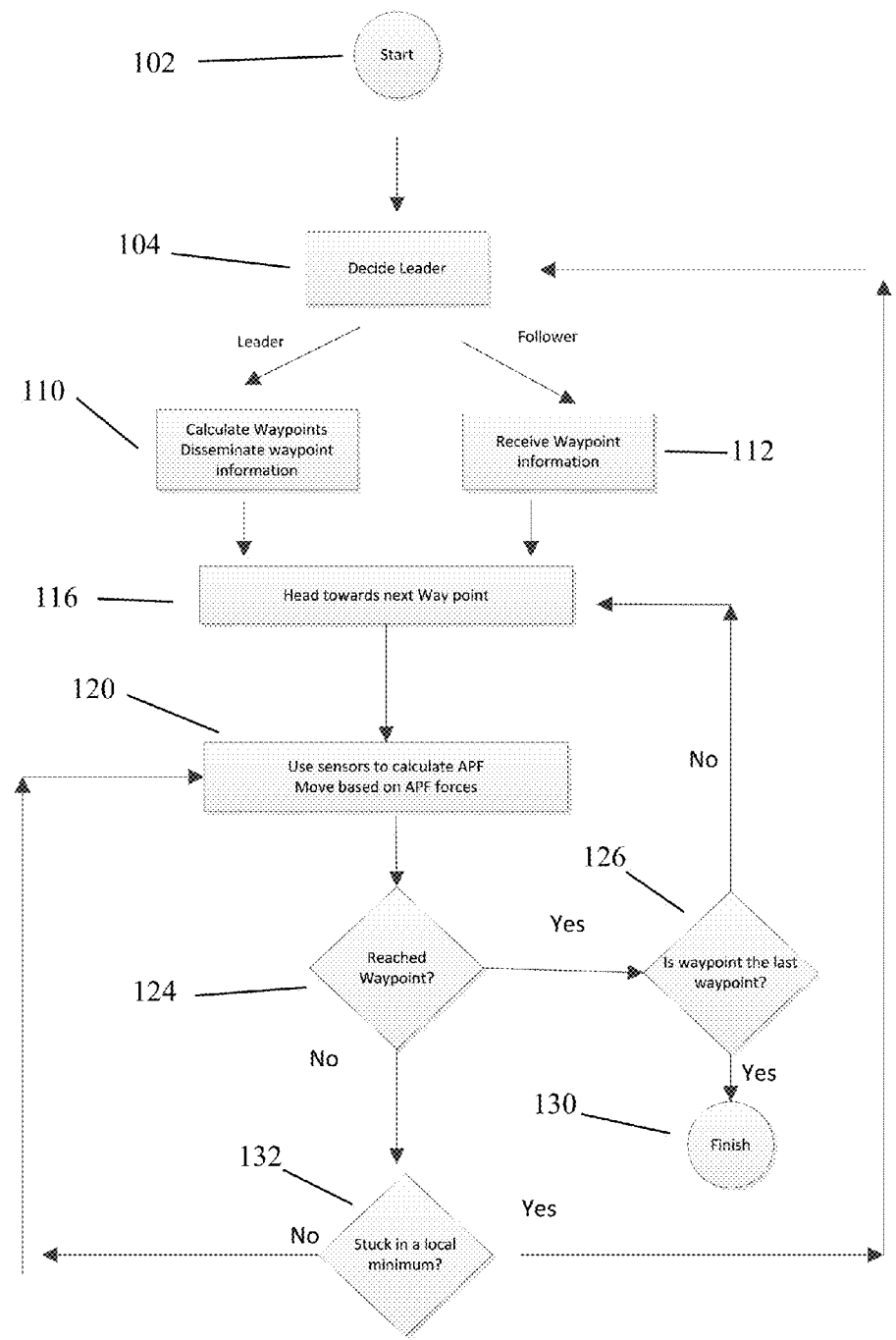
FIG. 7 is a flowchart documenting the logical steps that occur on each USV.

FIG. 7 is a flowchart documenting the logical steps that occur on each USV. It shows the decisions and actions that each USV takes in order to navigate to the end goal After Start step 102, the Decide Leader step 104 indicates the leader to step 110, and the follower(s) to step 112.

Step 110 is the Calculate Waypoints Disseminate Waypoint Information step (for the leader). Step 112 is the Receive Waypoint Information step (for the followers).

The outputs of steps 110 and 112 are input to step 120, the Use Sensors To Calculate APF Move Based On APF Forces step.

The output of step 120 is input to step 124, Reached Waypoint? step. If the answer at step 124 is "Yes", the output is input to step 126, the Is Waypoint The Last Waypoint. If the answer at step 124 is "No", the output is input to step 132, Stuck In A Local Minimum step.

If the answer at step 126 is "Yes", the process is finished at step 130. If the answer at step 126 is "No", the process returns to step 116.

If the answer at step 132 is "Yes", the process returns to step 104. If the answer at step 132 is "No", the process returns to step 120.

A system and method for a USV fleet is disclosed that can execute autonomous path-planning in an A2/AD environment, where communication reach back to a base station for instruction or Positional, Navigation, and Timing (PNT) data is not assured.

This process has the ability to adapt considering the failure and intermittent connection of the ad-hoc USV-to-USV data network. This process also has the ability to continue operation considering the failure of any or all communications between members and is immediately prepared for reconnection should failures occur.

A well-known navigation problem with APF is in the case when the navigating unit's virtual forces sum to zero, often referred to as a "local minimum". Falling into a local minimum is similar to a sailboat hitting a pocket of no wind on the ocean.

Waypoints are strategically placed to designate the optimal route. In our case, local minima occur when unanticipated obstacles (those not considered during previous waypoint calculations) are immediately in the way. Our solution is to recalculate the optimal sequence of waypoints while considering all known obstacles, thereby eliminating the local minimum.

The path planning strategy employed is robust enough to handle positional disturbances on individual agents and has the ability to maintain formation control when varying disturbances are applied on the group of agents Other applications include the any physical domain (underwater, ground, air, space). Also, this system and method are not limited to simply to one domain. For example, adding a cooperative unmanned aerial vehicle (UAV) would increase the situational awareness of the autonomous fleet of USVs.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A method for navigating a fleet of multiple unmanned vehicles from a first starting location to a second ending location via an initial pathway of waypoints, the iterative method for each of the unmanned vehicles comprising:

accumulating sensor information representative of obstacle locations and boundaries of one or more sensed obstacles and vehicle locations of other sensed vehicles in the fleet between the first and second locations;

calculating artificial potential field (APF) additive force vectors representative of virtual forces between each of the vehicles and between each vehicle and the sensed obstacles, including calculating when a force vector is zero which is representative of a local minimum;

responsive to the local minimum, communicating to the fleet that a new path needs to be generated and generating a new path forward, including calculating one or more new path forward waypoints such that the local minimum is removed because of attraction to the new waypoints by calculating additive force vectors to remove the local minimum and attract the vehicle to the new waypoints around the sensed obstacles and the other sensed vehicles to the second location.

2. The method of claim 1 where each vehicle iteratively broadcasts position updates and calculates the APF force vectors.

3. The method of claim 2 where obstacles are sensed and estimated as a point-cloud, the obstacle point-cloud representation is abstracted on a grid representation of a map, a graph search algorithm is used and the waypoints to the destination location are the output, and the waypoints are applied to a real map.

4. The method of claim 3 where one of the vehicles in the fleet is designated as the current leader vehicle.

5. The method of claim 4 where a first group of one or more of the UVs lose communication others of the vehicles over a set period of time such that the first group stops operationally relying upon the others of the vehicles and where the current leader vehicle requests information and calls for an election of a new leader vehicle.

6. The method of claim where the new leader vehicle listens and waits for responses and disseminates an analysis and decision.

7. The method of claim 6 where the vehicles are underwater vehicles.

8. The method of claim 6 where the vehicles are ground vehicles.

9. The method of claim 6 where the vehicles are air vehicles.

10. The method of claim 6 where the vehicles are space vehicles.

11. The method of claim 6 where at least two of the vehicles are different from a group of underwater, ground, air and space vehicles.

12. A method for navigating a fleet of multiple unmanned vehicles from a first starting location to a second ending location via an initial pathway of waypoints, the iterative method for each of the unmanned vehicles comprising:

accumulating sensor information representative of obstacle locations and boundaries of one or more sensed obstacles and vehicle locations of other sensed vehicles in the fleet between the first and second locations;

calculating artificial potential field (APF) additive force vectors representative of virtual forces between each of the vehicles and between each vehicle and the sensed obstacles, including calculating when a force vector is zero which is representative of a local minimum;

responsive to the local minimum, communicating to the fleet that a new path needs to be generated and generating a new path forward, including calculating one or more new path forward waypoints such that the local minimum is removed because of attraction to the new waypoints by calculating additive force vectors to remove the local minimum and attract the vehicle to the new waypoints around the sensed obstacles and the other sensed vehicles to the second location; where each vehicle iteratively broadcasts position updates and calculates the APF force vectors and where obstacles are sensed and estimated as a point-cloud, the obstacle point-cloud representation is abstracted on a grid representation of a map, a graph search algorithm is used and the waypoints to the destination location are the output, and the waypoints are applied to a real map.

13. A method for navigating a fleet of multiple unmanned vehicles from a first starting location to a second ending location via an initial pathway of waypoints, the iterative method for each of the unmanned vehicles comprising:
   accumulating sensor information representative of obstacle locations and boundaries of one or more sensed obstacles and vehicle locations of other sensed vehicles in the fleet between the first and second locations;
   calculating artificial potential field (APF) additive force vectors representative of virtual forces between each of the vehicles and between each vehicle and the sensed obstacles, including calculating when a force vector is zero which is representative of a local minimum;
   responsive to the local minimum, communicating to the fleet that a new path needs to be generated and generating a new path forward, including calculating one or more new path forward waypoints such that the local minimum is removed because of attraction to the new waypoints by calculating additive force vectors to remove the local minimum and attract the vehicle to the new waypoints around the sensed obstacles and the other sensed vehicles to the second location; where each vehicle iteratively broadcasts position updates and calculates the APF force vectors and where obstacles are sensed and estimated as a point-cloud, the obstacle point-cloud representation is abstracted on a grid representation of a map, a graph search algorithm is used and the waypoints to the destination location are the output, and the waypoints are applied to a real map, and where one of the vehicles in the fleet is designated as the current leader vehicle, where a first group of one or more of the UVs lose communication others of the vehicles over a set period of time such that the first group stops operationally relying upon the others of the vehicles and where the current leader vehicle requests information and calls for an election of a new leader vehicle, and where the new leader vehicle listens and waits for responses and disseminates an analysis and decision.

14. The method of claim 13 where the vehicles are underwater vehicles.

15. The method of claim 13 where the vehicles are ground vehicles.

16. The method of claim 13 where the vehicles are air vehicles.

17. The method of claim 13 where the vehicles are space vehicles.

18. The method of claim 13 where at least two of the vehicles are different from a group of underwater, ground, air and space vehicles.

* * * * *